(12) United States Patent
Cui et al.

(10) Patent No.: US 12,328,529 B2
(45) Date of Patent: Jun. 10, 2025

(54) SEAMLESS SWITCHING METHOD, DEVICE AND STORAGE MEDIUM OF HARDWARE DECODING DYNAMIC RESOLUTION

(71) Applicant: SHANGHAI BILIBILI TECHNOLOGY CO., LTD., Shanghai (CN)

(72) Inventors: Honglei Cui, Shanghai (CN); Hanchao Zheng, Shanghai (CN); Hui Chen, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 239 days.

(21) Appl. No.: 17/425,226

(22) PCT Filed: Dec. 16, 2019

(86) PCT No.: PCT/CN2019/125522
§ 371 (c)(1),
(2) Date: Jul. 22, 2021

(87) PCT Pub. No.: WO2020/151398
PCT Pub. Date: Jul. 30, 2020

(65) Prior Publication Data
US 2022/0124281 A1 Apr. 21, 2022

(30) Foreign Application Priority Data
Jan. 23, 2019 (CN) .......................... 201910061500.9

(51) Int. Cl.
*H04N 7/01* (2006.01)
*H04N 19/169* (2014.01)
(Continued)

(52) U.S. Cl.
CPC ......... *H04N 7/0117* (2013.01); *H04N 19/188* (2014.11); *H04N 19/423* (2014.11);
(Continued)

(58) Field of Classification Search
CPC .. H04N 7/0117; H04N 19/188; H04N 19/423; H04N 19/124; H04N 19/159;
(Continued)

(56) References Cited

U.S. PATENT DOCUMENTS 9,681,183 B1 * 6/2017 Majid ................ H04N 21/4122
2002/0133247 A1 9/2002 Smith et al.
(Continued)

FOREIGN PATENT DOCUMENTS

CN 101371584 A 2/2009
CN 102137248 A 7/2011
(Continued)

OTHER PUBLICATIONS

International Patent Application No. PCT/CN2019/125522; Int'l Search Report; dated Mar. 19, 2020; 3 pages.

*Primary Examiner* — Michael E Teitelbaum
(74) *Attorney, Agent, or Firm* — BakerHostetler

(57) ABSTRACT

The present invention provides a method, device and computer-readable medium of a seamless and dynamic switch between resolutions based on hardware decoding and belongs to a field of the internet technology. According to the method, device and computer-readable medium of the present invention, during a DASH video playback, when it needs to switch to another resolution, the original decoder continues to decode the video stream in the original encoded format that already stores in a buffer, while the video stream in the original encoded format is decoded, a second decoder corresponding to a target encoded format is initialized based on a video stream in the target encoded format received by (Continued)

the original decoder, and the video stream of the target encoded format is decoded by the second decoder, so as to realize the seamless switch between resolutions, avoid a jam in the process of playing the video, and improve the user experience.

12 Claims, 2 Drawing Sheets

(51) Int. Cl.
    *H04N 19/423*     (2014.01)
    *H04N 21/4402*     (2011.01)
    *H04N 21/442*     (2011.01)

(52) U.S. Cl.
    CPC ............... *H04N 21/440263* (2013.01); *H04N 21/44209* (2013.01)

(58) Field of Classification Search
    CPC ..... H04N 21/440263; H04N 21/44209; H04N 21/440218; H04N 21/44029; H04N 21/4402; H04N 21/64735; H04N 21/6175; H04N 21/643; H04N 21/4122; H04N 21/64738; H04L 65/613
    USPC ......................................................... 348/441
    See application file for complete search history.

(56) References Cited

U.S. PATENT DOCUMENTS

| | | | | |
|---|---|---|---|---|
| 2015/0146778 A1* | 5/2015 | De Cicco | ............. | H04N 19/115 375/240.07 |
| 2015/0245050 A1* | 8/2015 | Tourapis | .............. | H04N 19/137 375/240.02 |
| 2016/0037193 A1* | 2/2016 | Kasatani | ........ | H04N 21/234309 725/110 |
| 2016/0044292 A1 | 2/2016 | Gordon et al. | | |
| 2016/0127728 A1 | 5/2016 | Tanizawa et al. | | |
| 2016/0234526 A1* | 8/2016 | Wang | ................. | H04N 21/8456 |
| 2017/0289214 A1* | 10/2017 | Cho | .................... | H04L 65/4015 |
| 2018/0014037 A1* | 1/2018 | Venkatraman | .......... | G06F 16/78 |
| 2018/0115796 A1* | 4/2018 | Yang | ......................... | H04L 1/00 |
| 2018/0146230 A1* | 5/2018 | Zhang | .................. | H04L 65/613 |
| 2018/0352248 A1* | 12/2018 | Nishi | ................... | H04N 19/513 |
| 2019/0158829 A1* | 5/2019 | Ohkawa | ............... | H04N 19/159 |
| 2019/0182518 A1* | 6/2019 | Mittal | ............. | H04N 21/23439 |
| 2021/0195206 A1* | 6/2021 | Hannuksela | ........... | G06N 3/084 |

FOREIGN PATENT DOCUMENTS

| | | |
|---|---|---|
| CN | 103200425 A | 7/2013 |
| CN | 103856806 A | 6/2014 |
| CN | 104768051 A | 7/2015 |
| CN | 103858419 B | 10/2016 |
| CN | 106131610 A | 11/2016 |
| CN | 106792124 A | 5/2017 |
| CN | 107431819 A | 12/2017 |
| CN | 107707976 A | 2/2018 |
| CN | 108055250 A | 5/2018 |
| CN | 108737893 A | 11/2018 |
| CN | 109218763 A | 1/2019 |
| EP | 1791355 B1 | 2/2015 |
| WO | WO 2004/010281 A1 | 1/2004 |
| WO | WO 2017/180439 A1 | 10/2017 |

\* cited by examiner

SEAMLESS SWITCHING METHOD, DEVICE AND STORAGE MEDIUM OF HARDWARE DECODING DYNAMIC RESOLUTION

CROSS-REFERENCE TO RELATED APPLICATION

The present application is a national phase application of PCT international patent application No. PCT/CN2019/125522, filed on Dec. 16, 2019, which claims priority to Chinese patent application No. 201910061500.9, filed on Jan. 23, 2019. The entire disclosure of the above-identified application is hereby incorporated by reference herein and made a part of this specification.

TECHNICAL FIELD

The present invention relates to a technical field, more particularly to the technical field, and specifically to refer to a seamless switching method, a device and a computer-readable storage medium of hardware decoding dynamic resolution.

BACKGROUND

The existing mobile player usually provides two video decoding schemes: software decoding and hardware decoding. Generally, the hardware decoding is preferred by a player client, because the hardware decoding takes up less system resources and computing performance of the player client using the hardware decoding is higher.

DASH (Dynamic Adaptive Streaming over HTTP) video is a common network video format, during a DASH video playback, a switching of a video definition involves a change of video coding, a video decoder needs to adapt to a switching between H.264 and H.265. Since an initialization of the video decoder takes a certain time, it is easy to get stuck when switching, the video playback is not smooth, and user's viewing experience is poor.

How to provide a seamless switching method of hardware decoding resolution suitable for the DASH video to avoid sticking during playback, and improve the user experience has become an urgent problem in the field.

SUMMARY

The purpose of the present invention is to overcome disadvantages of the prior art, and provide a seamless switching method, device and computer-readable storage medium of hardware decoding dynamic resolution, when a resolution is switched, an original decoder continues to decode a video stream of an original encoded format in a cache in an original format, and then initializes a second decoder corresponding to a target encoded format to decode, and starts decoding by the second decoder, so as to realize the seamless switching between resolutions.

In order to realize the above purpose, the seamless switching method of hardware decoding dynamic resolution in this present invention includes the following steps:

(1) after receiving a packaged video, a player performing an unpacking operation on the packaged video to obtain a video stream with a first encoded format;
(2) the player decoding the video stream with the first encoded format using a first decoder, and playing a video at a first resolution;
(3) the player receiving a switching separation rate instruction;
(4) the player performing the unpacking operation on the packaged video to obtain a video stream with a second encoded format;
(5) the player decoding the video stream with the second encoded format using a second decoder and playing video at a second resolution.

In the seamless switching method of hardware decoding dynamic resolution, the packaged video is a DASH format video.

In the seamless switching method of hardware decoding dynamic resolution, the first encoded format is any one of H.264 encoded format and H.265 encoded format, and the second encoded format is another one of the above two encoded formats except the first encoded format; the first decoder is a decoder corresponding to the first encoded format, and the second decoder is a decoder corresponding to the second encoded format.

In the seamless switching method of hardware decoding dynamic resolution, the step (5) specifically comprises the following steps:

(51) the first decoder receiving the video stream with the second encoded format;
(52) after the video stream with the first decoding format is decoded by the first decoder completely, stopping the first decoder;
(53) initializing the second decoder;
(54) the second decoder decoding the video stream with the second encoded format and outputting the video at the second resolution.

In the seamless switching method of hardware decoding dynamic resolution, in the step (4), the obtain the video stream with the second encoded format specifically comprises:

obtaining the video stream with the second encoded format, encoding information of the second encoded format is carried in a first frame of the video stream with the second encoded format;
the step (53) specifically comprises:
initializing the second decoder according to the encoding information of the second encoded format.

In the seamless switching method of hardware decoding dynamic resolution, the step (3) specifically comprises:

the player detecting a bandwidth of a network for receiving the packaged video in real time, and generating the switching separation rate instruction according to a detection result automatically.

In the seamless switching method of hardware decoding dynamic resolution, the step (3) specifically comprises:

generating a corresponding switching separation rate instruction by a user operation received by the player.

In the seamless switching method of hardware decoding dynamic resolution, the player is an iOS video player, the decoder is a VideoToolbox hardware decoder.

In the seamless switching method of hardware decoding dynamic resolution, the player is an Android video player, the decoder is a MediaCodec hardware decoder.

This present invention further provides a computer-readable storage medium, storing computer programs, when the computer programs are executed by a processor, the seamless switching method of hardware decoding dynamic resolution is realized.

This present invention further provides a seamless switching device of hardware decoding dynamic resolution, which comprises a processor and a memory, wherein the memory stores computer programs, when the computer programs are executed by the processor, the seamless switching method of hardware decoding dynamic resolution is realized.

The seamless switching method, device and computer-readable storage medium of hardware decoding dynamic resolution are adopted. In this method, during DASH video playback, when it is needed to switch another resolution, an original decoder continues to decode a video stream in an original encoded format stored in a buffer, while the video stream of the original encoded format is decoded, a second decoder corresponding to a target encoded format is initialized based on a video stream in the target encoded format received by the original decoder, and the video stream in the target encoded format is decoded by the second decoder, so as to realize the seamless switch between resolutions, avoid a jam in the process of playing the video, and improve the user experience. And the method, device and computer-readable storage medium of a seamless and dynamic switch between resolutions based on hardware decoding of the present invention have the advantages of simple implementation, low application cost and wide application range.

DETAILED DESCRIPTION OF ILLUSTRATIVE EMBODIMENTS

In order to be able to understand the technical content of the present invention more clearly, the following embodiments are particularly described.

Figure 1:
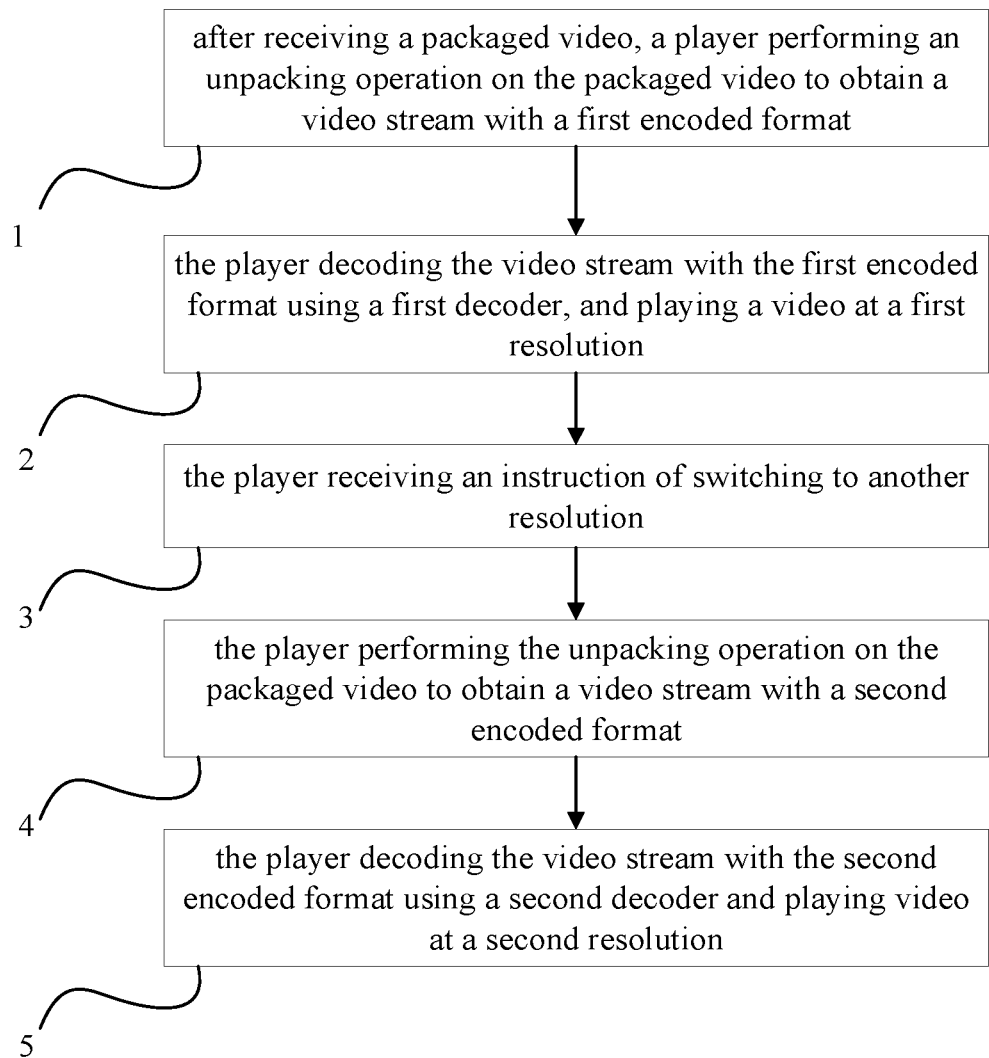
FIG. 1 illustrates a flowchart of steps of a seamless switching method of hardware decoding dynamic resolution of the present invention.

Please refer to FIG. 1, it is a flowchart of steps of a seamless switching method of hardware decoding dynamic resolution of the present invention.

In one embodiment, the flowchart of steps of a seamless switching method of hardware decoding dynamic resolution includes the following steps:
  (1) after receiving packaged video data, a player performing an unpacking operation on the packaged video data to obtain a video stream with a first encoded format, video frames obtained after the unpacking operation carries encoding information (H.264 or H.265) for decoder identification;
  (2) the player decoding the video stream with the first encoded format using a first decoder, and playing a video at a first resolution;
  (3) the player receiving an instruction of switching to another resolution of the video; (4) the player performing the unpacking operation on the packaged video data to obtain a video stream in a second encoded format; wherein a first frame of the video stream in the second encoded format carries extra-data (codec encoding information), the codec encoding information indicative of the second encoded format is used for initializing a second decoder;
  (5) the player decoding the video stream in the second encoded format using the second decoder and playing video at a second resolution.

Wherein, the packaged video is a DASH format video. The first encoded format is H.264 encoded format, and the second encoded format is H.265 encoded format, and vice versa. The first decoder is a decoder corresponding to the first encoded format, and the second decoder is a decoder corresponding to the second encoded format.

In a preferred embodiment, the step (5) specifically comprises the following steps:
  (51) the first decoder receiving the video stream in the second encoded format;
  (52) after the video stream in the first decoding format is decoded by the first decoder completely, stopping the first decoder;
  (53) initializing the second decoder;
  (54) the second decoder decoding the video stream with the second encoded format and outputting the video at the second resolution.

In a further preferred embodiment, in the step (4), the obtain the video stream with the second encoded format specifically comprises:
  obtaining the video stream with the second encoded format, wherein encoding information of the second encoded format is carried in a first frame of the video stream with the second encoded format;
  the step (53) specifically comprises:
  initializing the second decoder according to the encoding information of the second encoded format.

In another preferred embodiment, the step (3) specifically comprises: the player detecting a bandwidth of a network for receiving the packaged video in real time, and generating the switching separation rate instruction according to a detection result automatically. Or the step (3) specifically comprises: generating a corresponding switching separation rate instruction by a user operation received by the player.

In a further preferred embodiment, the player can be an iOS video player, correspondingly, the decoder is a Video-Toolbox hardware decoder. The player can also be an Android video player, correspondingly, the decoder is a MediaCodec hardware decoder.

The present invention also provides a seamless switching device and computer-readable storage medium of hardware decoding dynamic resolution, the device includes a processor and a memory. The memory is the computer-readable storage medium, storing computer programs. When the computer programs are executed by the processor, the seamless switching method of hardware decoding dynamic resolution is realized.

Figure 2:
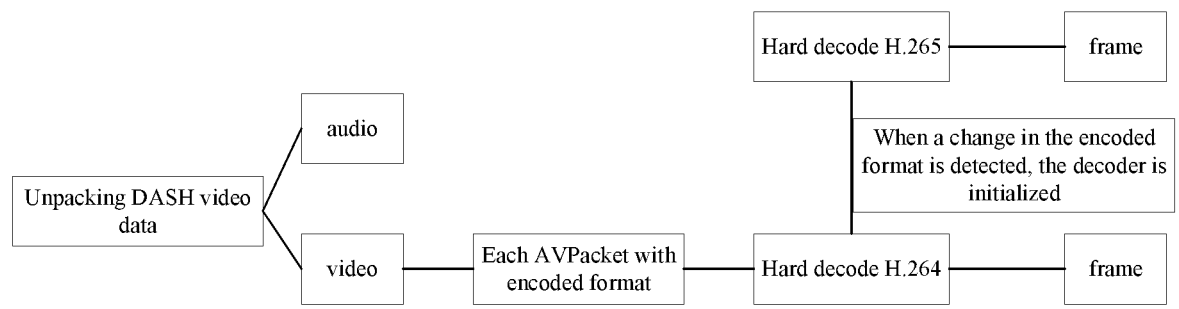
FIG. 2 illustrates a flow diagram of the seamless switching method of hardware decoding dynamic resolution in the practical application of the present invention.

In a practical application, the flow of the seamless switching method of hardware decoding dynamic resolution of the present invention is shown in FIG. 2, and specific implementation manner of the method is illustrated by the following examples.

Embodiment 1

A user uses a mobile terminal, such as a mobile phone, to play a DASH video, and the mobile terminal is set to hardware decoding. A playback resolution set at this time is 480 P. The DASH video begins to unpack to get a corresponding video stream of H.264 encoded format. The H.264 hard decoder is initialized, and the video stream of H.264 encoded format is decoded into frames, then, the video can be played at a resolution of 480 P. When the user switches the picture quality from 480P to 720 P manually, the video encoded output after the DASH video is unpacked becomes H.265 format. A changed first frame needs to carry extra data initialized by codec to initialize the data of the decoder. After the decoder detects the encoded format is changed, the H.264 hard decoder continues to decode and complete all the data in a buffer while the H.264 hard decoder initiates the H2.65 decoder at the same time. Then the H.265 hard decoder starts to decode the H.265 format encoded video stream and outputs the frame to complete the resolution switching.

In the DASH video, the resolution of 1080 P and 720 P of the DASH video are encoded in H.265, and the resolution of 480 p and 360 p of the DASH video are encoded in H.264. Therefore, resolution switching from 360 p to 1080 p is the same as the above process. When the resolution is switched from 720 p to 480 p, the conversion from H.265 decoder to H.264 decoder is similar to the above process The mobile terminal can be an iOS device, then the player is an iOS video player, correspondingly, the decoder is a VideoToolbox hardware decoder. The mobile terminal can be an Android device, then the player is an Android video player, correspondingly, the decoder is a MediaCodec hardware decoder.

Embodiment 2

Difference between the embodiment 2 and the embodiment 1 is that the mobile terminal such as the mobile phone used by the user can detect a bandwidth of a network. During the DASH video playback, after a change of the bandwidth is detected, whether the resolution needs to be adjusted can be determined automatically. When the resolution needs to be adjusted, the switching is completed automatically according to a current resolution and a target resolution of the switching process which described in the embodiment 1. The automatic switching mode can adapt to the bandwidth to the greatest extent, avoid the jam, and ensure the users' viewing experience.

The seamless switching method, device and computer-readable storage medium of hardware decoding dynamic resolution are adopted. In this method, during DASH video playback, when it is necessary to switch a resolution, an original decoder continues to decode a video stream of an original encoded format in a cache in an original format, after the video stream of the original encoded format is decoded, a second decoder corresponding to a target encoded format is initialized according to a video stream of the target encoded format received by the original decoder, and the video stream of the target encoded format is decoded by the second decoder, so as to realize the seamless switching between resolutions, avoid the jam in the process of playing, and improve the user experience. And the seamless switching method, device and computer-readable storage medium of hardware decoding dynamic resolution of the present invention have the advantages of simple implementation, low application cost and wide application range.

In this specification, the present invention has been described with reference to its specific embodiments. However, it is clear that various modifications and changes can still be made without departing from the spirit and scope of the present invention. Therefore, the specification and drawings shall be considered as illustrative rather than restrictive.

What is claimed is:

1. A method of implementing a seamless and dynamic switch between resolutions based on hardware decoding, comprising:
   in response to receiving packaged video data associated with a video, performing an unpacking operation on the packaged video data to obtain a video stream of the video in a first encoded format by a player, wherein the packaged video data are in a DASH (Dynamic Adaptive Streaming over HTTP) format, and wherein the first encoded format is one of two encoded formats comprising an H.264 (MPEG-4 Advanced Video Coding) encoded format or an H.265 (High Efficiency Video Coding) encoded format;
   decoding the video stream in the first encoded format using a first decoder, and playing the video at a first resolution by the player;
   receiving an instruction of switching to a second resolution of the video, wherein the instruction of switching is external to the packaged video data;
   performing the unpacking operation on the packaged video data to obtain a video stream of the video in a second encoded format by the same player, wherein the second encoded format is another one of the two encoded formats, and wherein the second encoded format is different from the first encoded format;
   receiving at least one portion of the video stream in the second encoded format by the first decoder;
   initializing a second decoder of the same player based on the at least one portion of the video stream in the second encoded format received by the first decoder while decoding data associated with the video stream in the first encoded format stored in a buffer by the first decoder, wherein the second decoder of the same player is in coordination with the first decoder of the same player to implement the seamless and dynamic switch between the first resolution and the second resolution, wherein the first decoder is a decoder corresponding to the first encoded format, and the second decoder is a decoder corresponding to the second encoded format;
   decoding the video stream in the second encoded format using the second decoder and playing the video at the second resolution; and
   wherein the method further comprises:
   generating, by the player, the instruction of switching to the second resolution of the video based on user input received by the player.

2. The method of claim 1, further comprising:
   ending the first decoder when the decoding the data associated with the video stream in the first encoded format and stored in the buffer is completed by the first decoder.

3. The method of claim 1, further comprising:
   initializing the second decoder based on information indicative of the second encoded format, wherein the information indicative of the second encoded format is carried in a first frame of the video stream in the second encoded format.

4. The method of claim 1, further comprising:
   automatically generating, by the player, the instruction of switching to the second resolution of the video based on detecting a bandwidth associated with receiving the video data in real time.

5. A non-transitory computer-readable storage medium, storing computer programs, when the computer programs are executed by a processor, the computer programs cause the processor to perform operations comprising:
   in response to receiving packaged video data associated with a video, performing an unpacking operation on the packaged video data to obtain a video stream of the video in a first encoded format by a player, wherein the packaged video data are in a DASH (Dynamic Adaptive Streaming over HTTP) format, and wherein the first encoded format is one of two encoded formats comprising an H.264 (MPEG-4 Advanced Video Coding) encoded format or an H.265 (High Efficiency Video Coding) encoded format;

decoding the video stream in the first encoded format using a first decoder, and playing the video at a first resolution by the player;

receiving an instruction of switching to a second resolution of the video, wherein the instruction of switching is external to the packaged video data;

performing the unpacking operation on the packaged video data to obtain a video stream of the video in a second encoded format by the same player, wherein the second encoded format is another one of the two encoded formats, and wherein the second encoded format is different from the first encoded format;

receiving at least one portion of the video stream in the second encoded format by the first decoder;

initializing a second decoder of the same player based on the at least one portion of the video stream in the second encoded format received by the first decoder while decoding data associated with the video stream in the first encoded format stored in a buffer by the first decoder, wherein the second decoder of the same player is in coordination with the first decoder of the same player to implement a seamless and dynamic switch between the first resolution and the second resolution, wherein the first decoder is a decoder corresponding to the first encoded format, and the second decoder is a decoder corresponding to the second encoded format;

decoding the video stream in the second encoded format using the second decoder and playing the video at the second resolution; and wherein the operations further comprise:

generating, by the player, the instruction of switching to the second resolution of the video based on user input received by the player.

6. A device of implementing a seamless and dynamic switch between resolutions based on hardware decoding, which comprises a processor and a memory, wherein the memory stores computer programs, when the computer programs are executed by the processor the computer programs cause the processor to perform operations comprising:

in response to receiving packaged video data associated with a video, performing an unpacking operation on the packaged video data to obtain a video stream of the video in a first encoded format by a player, wherein the packaged video data are in a DASH (Dynamic Adaptive Streaming over HTTP) format, and wherein the first encoded format is one of two encoded formats comprising an H.264 (MPEG-4 Advanced Video Coding) encoded format or an H.265 (High Efficiency Video Coding) encoded format;

decoding the video stream in the first encoded format using a first decoder, and playing the video at a first resolution by the player;

receiving an instruction of switching to a second resolution of the video, wherein the instruction of switching is external to the packaged video data;

performing the unpacking operation on the packaged video data to obtain a video stream of the video in a second encoded format by the same player, wherein the second encoded format is another one of the two encoded formats, and wherein the second encoded format is different from the first encoded format;

receiving at least one portion of the video stream in the second encoded format by the first decoder;

initializing a second decoder of the same player based on the at least one portion of the video stream in the second encoded format received by the first decoder while decoding data associated with the video stream in the first encoded format stored in a buffer by the first decoder, wherein the second decoder of the same player is in coordination with the first decoder of the same player to implement the seamless and dynamic switch between the first resolution and the second resolution, wherein the first decoder is a decoder corresponding to the first encoded format, and the second decoder is a decoder corresponding to the second encoded format;

decoding the video stream in the second encoded format using the second decoder and playing the video at the second resolution; and wherein the operations further comprise:

generating, by the player, the instruction of switching to the second resolution of the video based on user input received by the player.

7. The non-transitory computer-readable storage medium of claim 5, the operations further comprising:

ending the first decoder when the decoding the data associated with the video stream in the first decoded format and stored in the buffer is completed by the first decoder.

8. The non-transitory computer-readable storage medium of claim 5, the operations further comprising:

initializing the second decoder based on information indicative of the second encoded format, wherein the information indicative of the second encoded format is carried in a first frame of the video stream in the second encoded format.

9. The non-transitory computer-readable storage medium of claim 5, the operations further comprising:

automatically generating, by the player, the instruction of switching to the second resolution of the video based on detecting a bandwidth associated with receiving the video data in real time.

10. The device of claim 6, the operations further comprising:

ending the first decoder when the decoding the data associated with the video stream in the first decoded format and stored in the buffer is completed by the first decoder.

11. The device of claim 6, the operations further comprising:

initializing the second decoder based on information indicative of the second encoded format, wherein the information indicative of the second encoded format is carried in a first frame of the video stream in the second encoded format.

12. The device of claim 6, the operations further comprising:

automatically generating, by the player, the instruction of switching to the second resolution of the video based on detecting a bandwidth associated with receiving the video data in real time.

* * * * *